Figure 1:
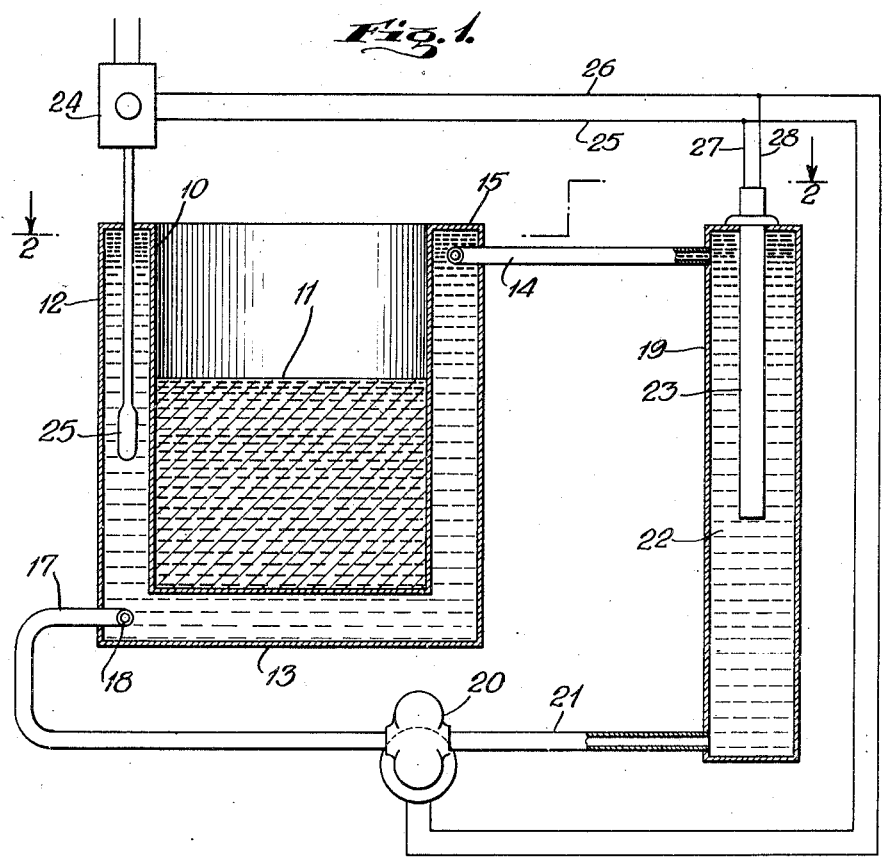

Sept. 27, 1949.     F. GREGOR     2,483,275
CHOCOLATE MIXER
Filed Jan. 25, 1946

INVENTOR
FRED GREGOR
BY
Howard C. Thompson
ATTORNEY

UNITED STATES PATENT OFFICE 2,483,275

CHOCOLATE MIXER

Fred Gregor, Brooklyn, N. Y., assignor of one-half to Norbert Roth, Forest Hills, N. Y.

Application January 25, 1946, Serial No. 643,473

3 Claims. (Cl. 257—2)

Figure 2:
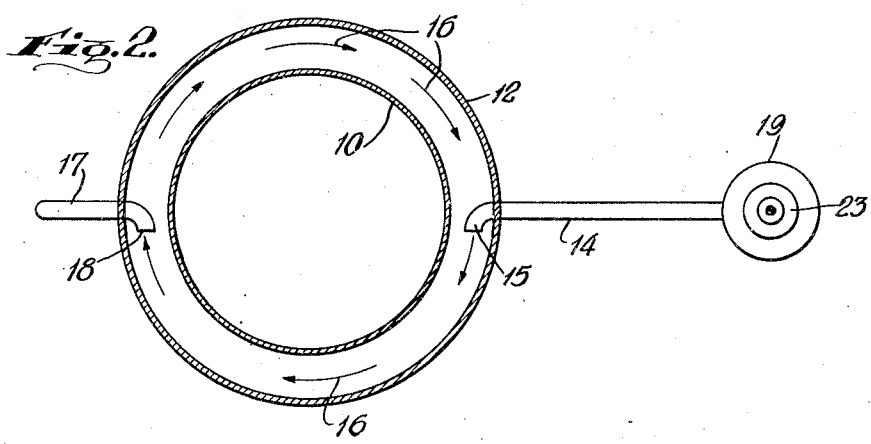

This invention relates to apparatus for preparing or mixing chocolates in the manufacture of chocolate, candy bars or the like. More particularly, the invention deals with means for automatically controlling and maintaining a predetermined temperature on the chocolate in melting, mixing or preparation thereof. The novel features of the invention will be best understood from the following description when taken together with the accompanying drawing, in which certain embodiments of the invention are disclosed, and in which the separate parts are designated by suitable reference characters in each of the views, and in which:

Fig. 1 is a diagrammatic view showing the temperature controlling apparatus; and Fig. 2 is a diagrammatic section on the line 2—2 of Fig. 1, omitting parts of the construction.

In the mixing of chocolate and in melting the same preparatory for use in the production of candy, or chocolate bars, difficulty has been experienced in maintaining the chocolate at a desired predetermined temperature. While attempts have been made to accomplish this result, in most instances, water jacketed vats have had the difficulty of differences in temperature at different levels of the vat, and this has interfered with the proper preparation of chocolate.

To overcome the objectionable features of the present methods of procedure, I have provided an automatic temperature control means for the mixing vat so that a substantially even and controlled temperature is maintained throughout the entire area of the vat, which results in a quick and more accurate preparation of the chocolate for intended use.

In Fig. 1 of the drawing I have diagrammatically shown at 10 a vat, in which a body of chocolate 11 is adapted to be heated while the chocolate is stirred or agitated by conventional means, not shown, as it forms no part of the present invention.

The vat 10 has a water jacket 12 which extends the full height of the vat and across the bottom of the vat, as indicated at 13. Communicating with the upper end portion of the water jacket 12 is an intake pipe 14, the discharge end 15 of which is directed forwardly, as seen in Fig. 1, and downwardly, as seen in Fig. 2, so as to establish a whirl like circulation of water to the jacket in the direction of the arrows 16, as the water travels from the top to the bottom of the jacket.

Communicating with the lower part of the jacket is a discharge pipe 17 having an offset end 18 within the jacket which is directed the same as the end 15. At one side of the water jacketed vat is a water heater 19 comprising a vertical tank with the upper end portion of which communicates the pipe 14, the pipe 17 communicates with a suitable water pump 20 from which extends a pipe 21 communicating with the lower portion of the tank 19. The pump 20 is adapted to provide a forced circulation of water through the jacket 12 so that the temperature of the water 22 in the tank 19 controlled by a suitable electric heater 23 is maintained throughout the entire water jacket.

At 24 is shown a thermostat, operation of which is controlled by a bulb 25 arranged in the jacket 12 and exposed to the heated water in said jacket. The thermostat 24 is electrically coupled with the heater 23 and also with the pump 20 by wires 25 and 26, including the extensions 27 and 28 to the heater 23. As soon as there is any drop in water temperature in the jacket 12, the thermostat will then function to put the heater and pump in operation and the thermostat may be controlled to operate at the slightest variance in a fixed or predetermined temperature so that the temperature of the water in the jacket may be maintained within one or two degrees of a fixed or predetermined temperature. It will be apparent that as soon as the desired temperature is again maintained in the water of the jacket 12, the thermostat will then shut off the heater 23 and the pump 20.

It will be understood that the illustration in the accompanying drawing is entirely diagrammatic, that is to say, the heater tank 23 in actual practice is relatively small as compared with the size of the water jacketed vat, enlargement has been made simply for clarification to the present illustration. Furthermore, such things as valves are well known and form no direct part of the present invention. It will also be apparent that the apparatus as a whole may employ the usual and known insulating materials to maintain a better control of temperature.

Having fully described my invention, what I claim as new and desire to secure by Letters Patent is:

1. An apparatus of the class described comprising a water jacketed container, a water heater in spaced relation to said container, means including a pump providing a forced circulation of water through the water heater and downwardly through the jacket of said tank, and automatic control means exposed to the water in the jacket of said tank for controlling heating of the water in said water heater and for automatically actuating said water circulating means.

2. An apparatus of the class described comprising a vat having a water jacket, a water heater, pipes placing the water of the water heater in circulation with water in said jacket, means comprising a thermostat exposed to the water in the jacket for automatically controlling the heating of water in the water heater, and means in one of said pipes and including said thermostat for providing a forced circulation of water from the water heater through the jacket of said vat.

3. An apparatus of the class described comprising a vat having a water jacket, a water heater, pipes placing the water of the water heater in circulation with water in said jacket, means comprising a thermostat exposed to the water in the jacket for automatically controlling the heating of water in the water heater, means in one of said pipes and including said thermostat for providing a forced circulation of water from the water heater downwardly through the jacket of said vat, and means for circumferentially whirling the water in said jacket.

FRED GREGOR.

REFERENCES CITED

The following references are of record in the file of this patent:

UNITED STATES PATENTS

| Number | Name | Date |
|---|---|---|
| 2,001,344 | Fielder | May 14, 1935 |
| 2,109,694 | Goble | Mar. 1, 1938 |
| 2,126,552 | Holloway | Aug. 9, 1938 |
| 2,255,986 | Rapisarda | Sept. 16, 1941 |